J. M. MURPHY.
SAW SETTING TOOL.
APPLICATION FILED AUG. 9, 1915.
1,164,381.
Patented Dec. 14, 1915.
2 SHEETS—SHEET 1.
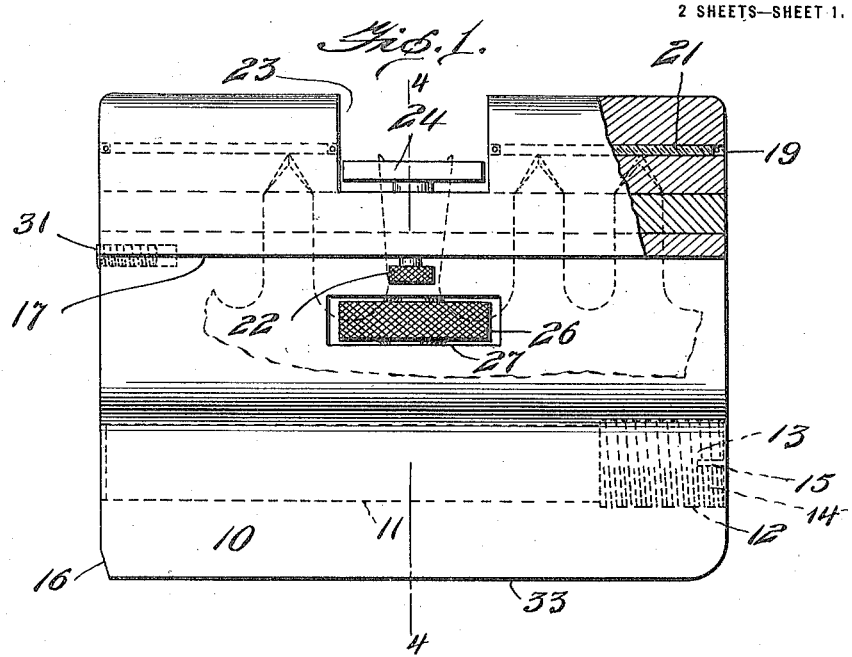
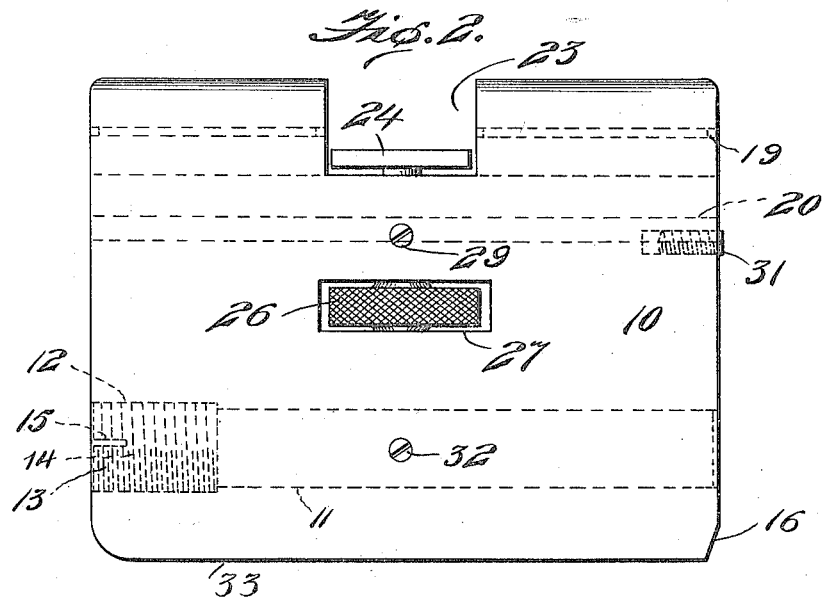
Inventor
J. M. Murphy,
By David P. Moore.
Attorney J. M. MURPHY.
SAW SETTING TOOL.
APPLICATION FILED AUG. 9, 1915.
1,164,381.
Patented Dec. 14, 1915.
2 SHEETS—SHEET 2.
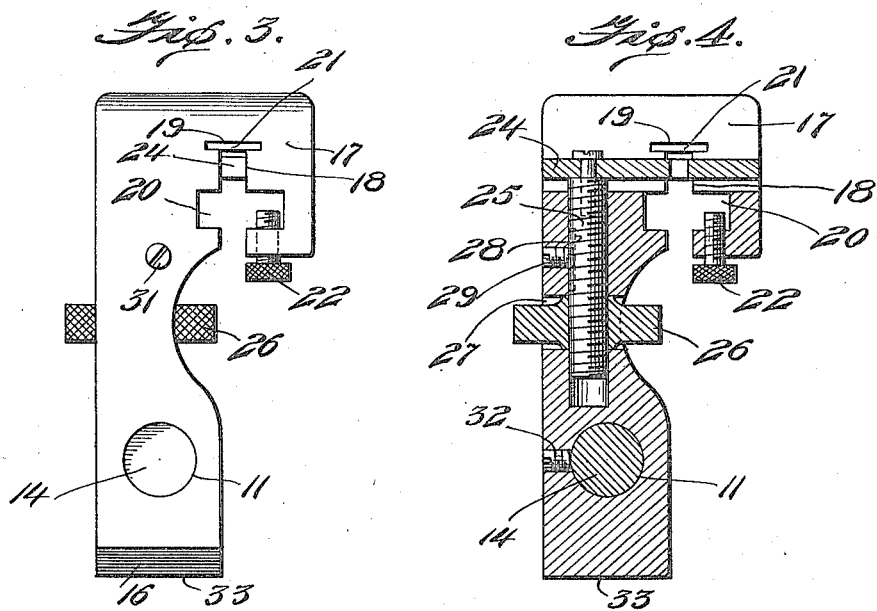
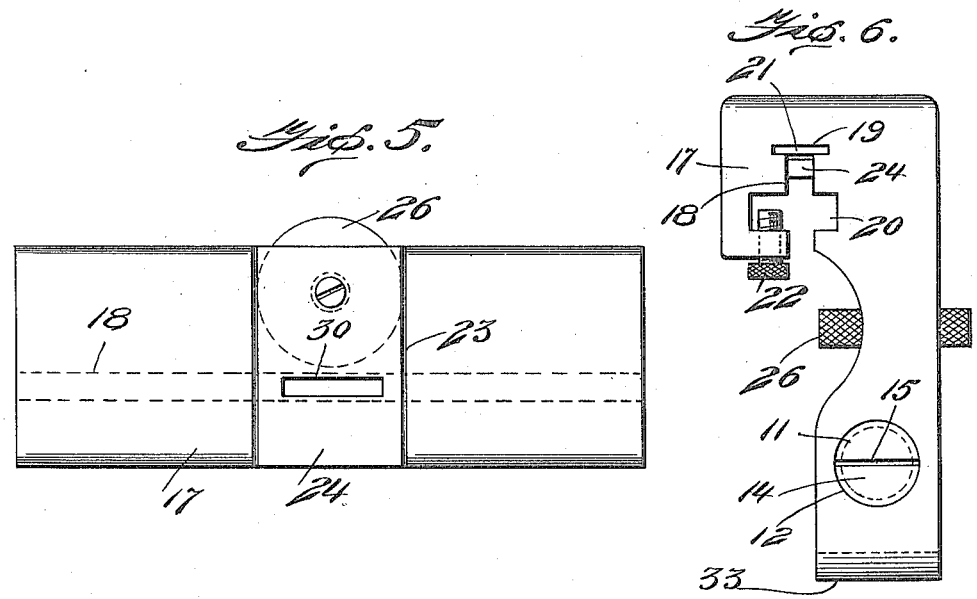
Inventor
J. M. Murphy
By David V. Moore
Attorney

UNITED STATES PATENT OFFICE.

JOHN M. MURPHY, OF TELLICO PLAINS, TENNESSEE.

SAW-SETTING TOOL.

1,164,381.   Specification of Letters Patent.   Patented Dec. 14, 1915.

Application filed August 9, 1915. Serial No. 44,552.

*To all whom it may concern:*

Be it known that I, JOHN M. MURPHY, a citizen of the United States, residing at Tellico Plains, in the county of Monroe and State of Tennessee, have invented certain new and useful Improvements in Saw-Setting Tools, of which the following is a specification.

The primary object of the invention is the provision of a saw setting tool, wherein the teeth of a cross-cut saw can be readily and uniformly set with accuracy, while the teeth of such saws can be filed or the rakers cut down so as to regulate the same and the drag teeth accurately gaged.

Another object of the invention is the provision of a saw setting tool of this character, wherein the construction thereof is novel in form, to assure the convenient use of the same.

A further object of the invention is the provision of a saw setting tool of this character, wherein the teeth of a saw can be quickly and easily set, gaged and set for the successful use of the saw.

A still further object of the invention is the provision of a saw setting tool of this character, which is extremely simple in construction, thoroughly reliable and efficient in operation, strong, durable, and inexpensive in manufacture.

With these and other objects in view the invention consists in the features of construction, combination of elements and arrangement of parts as will be hereinafter fully described in detail, illustrated in the accompanying drawing and pointed out in the claims hereunto appended.

In the accompanying drawing: Figure 1, is a side elevation of a saw setting tool constructed in accordance with the invention. Fig. 2, is a similar view looking toward the opposite side thereof. Fig. 3, is an end elevation. Fig. 4, is a sectional view on the line 4—4 of Fig. 1. Fig. 5 is an edge elevation. Fig. 6, is a view similar to Fig. 3, looking toward the opposite end.

Similar reference characters indicate corresponding parts throughout the several views in the drawing.

Referring to the drawing in detail, the saw setting tool comprises a plate like body 10, preferably made from metal, provided longitudinally therethrough near one longer edge with a bore 11, formed for a slight distance of its length with internal threads 12, with which engage corresponding external threads 13, on one end of an adjusting bolt 14, arranged within said bore 11, and this bolt in its threaded end is provided with a screw driver slot 15, which permits the use of a screw driver for the adjustment of the bolt in the bore, so that the opposite end of said bolt can be inset with relation to the end edge adjacent thereto of the body 10, for determining accurately the set desired to the teeth of a cross cut saw, while at one corner of the body 10, is a bevel 16, against which the teeth are placed for the initial bending thereof for the setting of the same. At the opposite longer edge of the body 10, is a right angular flange 17, having a guide slot 18, parallel with the side face adjacent thereto of the body 10, for receiving the drag teeth of a rip saw, and intersecting this slot at right angles thereto are inner and outer channels or grooves 19, and 20, respectively, the latter of which detachably receives a file for the cutting down of the teeth of a saw, while the inner channel or groove 19, has fixed therein a glass strip 21, on which rest the drag teeth of the said saw, when gaging the raker teeth thereof, in a manner presently described.

The glass strip 21, is used in the tool to prevent the cutting teeth of the saw from cutting the body 10, and thus getting the said tool out of order or alinement when once regulated for positioning the teeth therein, so as to determine the amount of each tooth to be taken off. On the strip 21, is adapted to rest the cutting teeth of the saw, when cutting down the drag teeth thereof.

The file is held in the channel or groove 20, by means of a set screw 22, which is threaded in the flange 17, on the body 10, of the saw setting tool.

Medially of the flange 17, in the outer face thereof is formed a recess or notch 23, in which is fitted a gage plate 24, preferably made from hardened steel, so as to prevent wear thereon when filing the teeth of the saw when cutting down the rakers. The file is placed in the channel or groove 20, for jointing the teeth of the saw. The plate 24, is mounted upon an adjusting screw 25, threaded in an externally knurled adjusting wheel 26, located within a slot 27, formed in the body 10, the screw being provided with a notch 28, in which engages a set screw 29, threaded in the body 10, for limiting the movement of the adjusting screw 25, and also for locking it for holding the gage plate 24, in adjusted position. The plate 24, is formed with a slot 30 for receiving the raker teeth, to permit gaging thereof.

The end of the body 10, coinciding with the bevel 16, is fitted with an adjusting screw 31, which serves as a bearing for the blade of the saw to true the heel thereof when the teeth of the same are placed against the bevel 16, or in position relative to the bolt 14, in the said body of the saw setting tool.

In the outer face of the body 10, is a set screw 32, which is designed to fasten the bolt 14, in adjusted position, when setting the teeth of a saw. The remaining longer edge 33, opposite the flange 17, can be used as a straight edge if desired.

The tool is especially useful for setting cross cut saws, and answers for a gage to cut the rakers down, while the bolt which is disposed longitudinally in the body regulates the set, thus taking the place of a spider in filing a saw.

From the foregoing it is thought that the construction and manner of use of the tool will be clearly understood and therefore a more extended explanation has been omitted.

What is claimed is:—

1. A saw set comprising a plate like body, having a flange at right angles thereto at one longer edge thereof, provided with a slot parallel with the side face adjacent thereto of the body, the said flange being cut away medially thereof in its outer face to provide a recess, a gage plate arranged in said slot, an adjusting screw supporting the gage plate and working in the body, and an adjusting wheel on said screw and exposed at opposite sides of the body, one corner of the body being beveled.

2. A saw set comprising a plate like body, having a flange at right angles thereto at one longer edge thereof, provided with a slot parallel with the side face adjacent thereto of the body, said flange being formed with inner and outer channels at right angles to and intersecting the slot, a glass strip in the inner channel, while the outer channel is adapted to receive a file, means for fastening the file in said channel, said flange being provided medially thereof in its outer face with a recess, a gage plate working in the recess, and means for adjusting the gage plate.

In testimony whereof I affix my signature.

JOHN M. MURPHY.

Copies of this patent may be obtained for five cents each, by addressing the "Commissioner of Patents, Washington, D. C."